United States Patent [19]

Liu et al.

[11] Patent Number: 4,741,950

[45] Date of Patent: May 3, 1988

[54] DIFFERENTIAL OPAQUE POLYMER FILM

[75] Inventors: Leland L. Liu, Macedon; Victor Platta, Mendon, both of N.Y.

[73] Assignee: Mobil Oil Corporation, New York, N.Y.

[21] Appl. No.: 921,579

[22] Filed: Oct. 22, 1986

[51] Int. Cl.⁴ .............................................. B32B 3/26
[52] U.S. Cl. .............................. 428/315.5; 428/317.9; 428/516; 428/910
[58] Field of Search .............. 428/313.3, 313.5, 313.9, 428/315.5, 317.9, 516, 910, 319.1

[56] References Cited

U.S. PATENT DOCUMENTS

| | | | |
|---|---|---|---|
| 4,377,616 | 3/1983 | Ashcraft et al. | 428/315.7 |
| 4,560,614 | 12/1985 | Park | 428/317.9 |
| 4,582,753 | 4/1986 | Duncan | 428/313.3 |

*Primary Examiner*—William J. Van Balen
*Attorney, Agent, or Firm*—Alexander J. McKillop; Michael G. Gilman; Charles J. Speciale

[57] ABSTRACT

A surface treated oriented polymer laminate film is disclosed which possesses a comparatively rough, non-blocking first surface and a smooth, lustrous second surface which is particularly well suited for further film processing operations such as metallization.

10 Claims, No Drawings

DIFFERENTIAL OPAQUE POLYMER FILM

BACKGROUND OF THE INVENTION

This invention relates to laminated polymer films and, more particularly, to an opaque multilayer film inhibited against film-to-film blocking on one surface thereof, the opposite surface retaining a smooth, lustrous appearance and being especially well suited for such further film processing operations as metallization.

U.S. Pat. No. 4,377,616 describes a biaxially oriented opaque polypropylene film having excellent overall characteristics. To use this material for some commercial wrapping purposes, it is necessary that the film be further modified so as to permit printing thereon and to permit the heat sealing or adhesive sealing of the film to itself or other surfaces. In order to prepare the surfaces of polymeric films for ink receptivity or the adhesion of glues and adhesives, it is a common practice to treat the surface of the film to enhance the wettability of these materials. Common techniques employed to increase the wettability of such materials, e.g., polypropylene, include corona discharge treatment and flame treatment. In the case of the subject films, however, it has been found that such treatment leads to destructive film-to-film blocking.

By way of overcoming this destructive blocking tendency resulting from the foregoing surface treatment techniques, U.S. Pat. No. 4,560,614 provides an opaque film of the type described in U.S. Pat. No. 4,377,616 but in its surface treated form, containing finely divided talc in each of its skin layers to prevent film-to-film blocking. However, the presence of talc in both skin layers has been found to make these layers unsuitable for such further film processing operations as metallization.

SUMMARY OF THE INVENTION

In accordance with the present invention, there is provided a surface treated, non-blocking opaque polymer film possessing an anti-blocking agent-free surface of smooth and lustrous appearance which is suitable for such further film processing operations as metallization.

Broadly stated, the present invention provides a differential oriented polymer film comprising:

(a) a core layer containing numerous microscopic voids which impart an opaque, lustrous appearance to the exposed surface of the second skin layer of the film;

(b) a first skin layer of enhanced wettability on its exposed surface adhering to one surface of the core layer, said skin layer containing an anti-blocking effective amount of anti-blocking agent to render said layer substantially non-blocking; and, (c) a second skin layer of enhanced wettability on its exposed surface adhering to the other surface of the core layer, said skin layer being substantially devoid of anti-blocking agent or any other component the presence of which would otherwise significantly attenuate the smooth and/or lustrous appearance of its exposed surface.

The term "differential" as applied to the oriented polymer film of this invention is intended to convey the distinctively dissimilar composition and appearance of each exposed film surface. Thus, whereas one exposed surface of the film is relatively rough and non-lustrous due to the incorporation of anti-blocking agent therein, and as such, is an unsuitable surface for some types of film processing techniques, metallization amongst them, the other exposed surface of the film, lacking as it does any anti-blocking component or other particulate ingredient, retains the opaque and lustrous appearance of the underlying core layer and as such is entirely suitable for other film processing procedures including metallization.

DESCRIPTION OF THE PREFERRED EMBODIMENTS

The opaque core layer of the laminate of this invention is prepared by the procedure described in U.S. Pat. No. 4,377,616 the disclosure of which is incorporated by reference herein. In order to achieve the opaque lustrous appearance of the film structure herein, it is important that a particular thickness relationship exist between the thickness of core layer (a) and the thickness of skin layers (b) and (c). It is preferred that the core thickness be from about 30 to about 90% of the overall structure. This, in combination with the population and configuration of the voids in a structure of at least about 0.5 mils thick, will materially contribute to the overall degree of opacity of the structure. The population and configuration of the voids and the core thickness will generally be such as to cause a significant degree of opacity, for example, less than about 30% light transmission. Similarly, by maintaining the skin thickness within a particular range in relation to the thickness of the core layer, the overall combination results in an opaque lustrous appearance. It is preferred that the average diameter of the void-initiating particles be from about 0.1 to about 10 microns. These particles should be approximately spherical in shape so as to initiate a void of fairly regular geometry and orientation in a stratified relationship throughout the thermoplastic polymer material of core layer (a) after biaxial orientation of the film. The voids need not be uniform in size. Generally speaking, each void tends to be of like shape even though it may vary in dimensions from those of other voids because all of the voids are initiated by a generally spherical particle. Ideally, the voids assume a shape defined by two opposed and edge-contacting concave disks.

Optimum characteristics of opacity and lustrous appearance are obtained when the two average major void dimensions are greater than about 30 microns.

The void-initiating particle material, as indicated above, should be incompatible with the polymer constituting the core material, at least at the temperature of biaxial orientation.

Core layer (a) has been described above as being a thermoplastic polymer material within which is located a strata of voids and cells. The term "strata" is intended to convey the understanding that the voids are so oriented that their major axes are aligned in correspondence with the direction of orientation of the polymeric film structure. After each void has been formed, the void-initiating particles occluded therein may contribute little else to the film laminate. For example, this may be the case where the refractive index of the void-initiating particles is close enough to that of the polymer constituting the core layer that it makes no apparent contribution to opacity. When this is the case, opacity is thought to be principally a function of the light scattering affect which occurs due to the presence of the voids in the core layer. The opacity of the film can be enhanced by the inclusion of opaquing pigment, e.g., titanium dioxide, dispersed throughout the core. A particularly preferred proportion of pigment in the core layer can be from about 1 to about 3% by weight thereof. The pigment material will be of such a size and shape that it will not significantly contribute to void initiation. The optional presence of opaquing pigment contributes perhaps 1 to 8% of the total opaqueness of the film.

A typical void may be described as having major dimensions X and Y and minor dimension Z where dimension X is aligned with machine direction orientation, dimension Y is aligned with transverse direction orientation and dimension Z approximately corresponds to the cross-sectional dimension of the spherical particle which initiates the void. It is necessary that orientation conditions be such that the X and Y dimensions of the voids of the core be major dimensions in comparison to the Z dimension. Thus, while the Z dimension generally approximates the cross-sectional dimension of the spherical particle initiating the void, the X and Y dimensions must be significantly greater. In addition, the orientation conditions must be such that the general integrity of the voids is maintained. By this, it is meant that during the orientation which produces the X and Y dimensions, that is, either by simultaneous or sequential machine direction and transverse direction orienting or stretching, the temperature conditions must be such as to permit these major dimensions to form without any significant destruction of voids in any of their dimensions. The voids are particularly vulnerable to destruction during sequential orientation if the stretching forces tend to cause internal shredding and void splitting. This leads to a complete loss of control over the integrity of the individual closed voids and the consequent integrity of the core polymer. Thus, one skilled in the art following the present general guidelines can orient at a temperature and to a degree which will yield X and Y dimensions approaching a maximum without causing any significant amount of splitting, shredding or overall lack of void and core integrity.

By way of illustration, room temperature biaxial orientation of polypropylene film (a) containing polybutylene terephthalate spheres of the size and amount contemplated herein will not produce the claimed structure. Either void splitting will occur or voids of insignificant size will result. Polypropylene must be oriented at a temperature which is significantly higher than its glass transition temperature. The temperature conditions must permit X and Y to be at least several multiples of the Z dimension without incurring any significant incidence of void splitting. If this is accomplished, optimum physical characteristics including low water vapor transmission rates and a high degree of light scattering will be obtained with little, if any, void splitting or film fibrillating.

As indicated above, the polymer constituting core layer (a) and the void-initiating particle must be incompatible in the sense that the materials form two distinct phases. The spherical void-initiating particles constitute a dispersed phase throughout the lower melting core polymer which polymer will, upon orientation, become a void-filled matrix with the spherical particles contained somewhere within the voids.

As a result of the biaxial orientation of the film laminate described herein, in addition to rendering its core layer opaque, the orientation improves other physical properties of the laminate such as flex-cracking resistance, Elmendorff tear strength, elongation, tensile strength, impact strength and cold strength properties. In addition to this, a unique and highly attractive lustrous appearance is imparted to the exposed surface of skin layer (c) of the film. Such appearance is generally not seen in the absence of this skin layer or if the thickness of this skin layer is not enough to conceal surface imperfections of the underlying core layer. The resulting film can also possess low water vapor transmission rate and low oxygen transmission rate characteristics. This makes the film ideally suited for packaging food products, including liquids. The film also has attractive utility as a decorative wrap material.

Generally, by far the greater number of voids will be closed as a result of which there is essentially no opportunity for liquid and/or gas to penetrate the core layer.

The void-initiating particles can be organic or inorganic and preferably are approximately spherical in shape and within a particle size range capable of forming voids which, in most cases, will take on a lens-like shape, i.e., a lens of biconvex shape. When a polymeric material is employed as the void-initiating particle, it can be a polymer which is comelted with the polymer of the core layer. In such case, it is necessary for the void-initiating polymer to have a sufficiently higher melting point than the core polymer to be incompatible therewith and to be capable of assuming a dispersed phase in the form of small spherical particles as the temperature of the co-melted mix is reduced. It is also contemplated that the void-initiating particles can be preformed and then uniformly dispersed into a melt of core polymer, e.g., one of polypropylene. This has the advantage of avoiding subjecting the core polymer to the temperature of a much higher melting polymer thereby minimizing the risk of thermal degradation of the core polymer.

It is believed that because of the number, shape and orientation strata-wise of the voids in core layer (a), a significantly enhanced light scattering effect is obtained. This effect is further increased by the presence of transparent or pigmented skin layer (b) coextensively applied to the core layer.

When pre-formed void-initiating particles are employed, it is the shape and size of the particles that is important rather than their chemical nature. Thus, solid or hollow organic or inorganic particles of any type can be employed. Interesting effects can be achieved by the use of spheres of different colors. Since statistically each void has approximately one particle somewhere within the void, interesting and aesthetically pleasing color and/or reflectance effects can be imparted to the overall layer structure by use of particles of different color absorption or reflectance. The light scattered in a particular void is additionally either absorbed or reflected by the void-initiating particle and a separate color contribution is made to the light scattering in each void.

The void-initiating particles can be based on any of a variety of thermoplastic resins such as polybutylene terephthalate, polyethylene terephthalate acetals, polyamides, acrylic resins, etc., provided they remain phase distinct and incompatible with the resin constituting the remainder of core layer (a). Polybutylene terephthalate (PBT), also known as polytetramethylene terephthalate (PTMT), is an especially preferred void-initiating material for use herein. This material is a highly crystalline polymer obtained from the polycondensation of dimethyl terephthalate with 1,4-butanediol. PBT possesses good mechanical, chemical and electrical properties. It has good flowability and a rapid crystallization rate. It has a melting point of 440° F. and a glass transition temperature of approximately 104° F. It has good thermostability and relatively high UL temperature indices. This material has good tensile strength, toughness and dimensional stability, low water absorption, and low static and dynamic coefficients of friction. Typical processing conditions for PBT involve melts at 450°–500° F. Melt temperatures in excess of 520° F. should be avoided.

Inorganic materials which are useful as void-initiating particles include solid or hollow preformed glass spheres, metal beads or spheres, ceramic spheres, etc. In fact, any material which can be formed into a sphere without causing thermal degradation to the core polymer is entirely suitable herein.

The incorporation of voids in the core layer of the present films permits a reduction in light transmission therethrough to as low as about 10% and even lower. This would be the case with a film having an overall thickness of at least about 1.5 mils where the core portion is at least about 60% of the total thickness and the skin layers makes up the remaining 40% thickness.

While the preferred particle size of the void-initiating particles is generally on the order of from about 0.1 to about 10 microns, it is particularly preferred that the particle size range from about 1 to about 5 microns. The void-initiating particles can be present in up to about 20% by weight of core layer (a) prior to orientation, a preferred range being from 2 to about 7 percent by weight.

For convenience and more precise control of the formulation and character of the core layer, a master batch technique can be employed either in the case of forming the spherical particles in situ or in adding preformed spheres to the molten core polymer. After the formation of a batch, appropriate dilution of this system can be made by adding additional thermoplastic core polymer until the desired proportions are obtained.

Prior to extrusion, the polymer constituting first skin layer (b) is blended with an anti-blocking effective amount of an anti-blocking agent, e.g., silica, silicate, clay, diatomaceous earth, talc, glass and the like, which is preferably provided in the form of approximately spheroidal particles having a particle size range of from about 0.5 to about 10 microns. Specific materials include Syloid, a synthetic amorphous silica gel having a composition of 99.7% $SiO_2$; diatomaceous earth having a composition of, for example, $SiO_2$ 92%, $Al_2O_3$ 3.3%, $Fe_2O_3$ 1.2%, which has an average particle size of about 5.5 microns, which particles are porous and irregularly shaped; dehydrated kaolonite (Kaopolite SF) having the composition $SiO_2$ 55%, $Al_2O_3$ 44%, $Fe_2O_3$ 0.4%, which has an average particle size of about 0.7 microns which particles are thin flat platelets; and synthetic precipitated silicates (Sipernat 44), for example, having a composition of $SiO_2$ 42%, $Al_2O_3$ 36%, $Na_2O$ 22%, which has an average particle size of about 3–4 microns and whose particles are porous and irregularly shaped. A commercially available talc which is useful as an anti-blocking agent herein is Cyprus Mistron ZSC Talc. The amount of anti-blocking agent incorporated in first skin layer (b) can vary widely, amounts ranging from about 1.0 to about 10, and preferably from 1.5 to about 8, percent by weight of first skin layer (b) being generally quite effective.

In addition to anti-blocking agent, first skin layer (b) can also contain other particulate additive(s) such as titanium dioxide, e.g., at 2 to 8 weight percent of the polymeric component of this layer, to confer enhanced opacity and brightness to the composite film structure when viewed from this surface. A satisfactory commercially available material is SCM Glidden RCL 4.

It is preferred to coextrude core layer (a), and skin layers (b) and (c) in producing the film laminate of this invention. Thereafter, the laminate (whether prepared by coextrusion or some other technique) is subjected to biaxial stretching, or orientation, to an extent and at a temperature calculated to provide the maximum degree of opacity without any significant impairment in the physical characteristics, including appearance, of the film. Obviously, as the materials employed in the construction of the film differ, the conditions of biaxial orientation will be modified to reflect such difference(s). By way of exemplification, when employing a stereoregular polypropylene as the core polymer and when employing PBT as the void-initiating material, a machine direction orientation of from about 4 to about 8 times at a drawing temperature of from 100° C. to 160° C. can be used to provide a cavitated, opaque, biaxially oriented film of from 0.7 to 5 mils overall thickness.

If desired, the exposed surfaces of skin layers (b) and (c) can be treated in a known and conventional manner, e.g., by corona discharge, to improve its receptivity to inks and/or its suitability for such subsequent manufacturing operations as metallization.

The following examples are illustrative of a laminate film structure in accordance with this invention and the process by which the laminate can be obtained.

EXAMPLE 1

A confined mixture of isotactic polypropylene (93 weight parts, MP 160° C. melt index 4.5) containing PBT (6 weight parts, MP 227° C.) as the void-initiating material and titanium dioxide particles (2 weight part) as whitener is melted in an extruder provided with a screw of L/D ratio of 20/1 to provide core layer (a). A second extruder in association with the first extruder is supplied with the same isotactic polypropylene as the first extruder but containing Cyprus Mistron ZSC talc (2 weight parts) as anti-blocking agent and titanium dioxide particles (4 weight parts) as whitener to provide first skin layer (b). A third coextruder in association with the first two extruders is provided with the same isotactic polypropylene, but devoid of talc and titanium dioxide, to provide second skin layer(c). A melt coextrusion is carried out while maintaining the cylinder of the core polymer material at a temperature sufficient to melt the polymer mixture, i.e., from about 230° C. to 290° C. or even higher. The polypropylene to be extruded as skin layers (b) and (c) is maintained at about the same temperature as the polypropylene used in fabricating core layer (a). A film laminate is coextruded with a core thickness representing 70% of the total extruded thickness with the skin thicknesses representing the balance. The unoriented film measures approximately 40 mils in thickness. This sheet is subsequently oriented eight by five and one-half times using a commercially available sequential biaxially orienting apparatus to provide a differential laminate film. The MD orientation temperature is about 140° C. and the TD orientation is about 150° C. The resulting 1.5 mil laminate film exhibits a relatively rough surface appearance of intensified opacity when viewed from its first surface and a smooth lustrous appearance when viewed from its second surface.

Other properties of the laminate are compared with the properties of essentially the same laminates prepared in accordance with U.S. Pat. No. 4,377,616 (Film A containing no talc or titanium dioxide particle in the skin layers) and U.S. Pat. No. 4,560,614 (Film B containing 2 weight parts talc and 4 weight parts titanium dioxide particles in both skin layers as shown in the following table.

| Film Type | | Film of Example 1 | Film A | Film B |
|---|---|---|---|---|
| Gauge (Mil) | | 1.5 | 1.5 | 1.5 |
| Light Transmission (%) | | 24 | 26 | 22 |
| Gloss, 45° | Upper Surface | 100 | 100 | 70 |
| | Lower Surface | 70 | 100 | 70 |
| Brightness | Upper Surface | 75 | 75 | 90 |
| | Lower Surface | 90 | 75 | 90 |
| Treatment (dyne/cm) | Upper Surface | 40 | 38 | 40 |
| | Lower Surface | 40 | 31 | 40 |
| Tensile Modulus (MPSI) | MD | 270 | 240 | 300 |
| | TD | 380 | 350 | 400 |
| Ultimate Tensile (MPSI) | MD | 18 | 15 | 20 |
| | TD | 25 | 20 | 30 |
| Elongation (%) | MD | 120 | 130 | 100 |
| | TD | 40 | 50 | 30 |
| Stiffness (g/in) | MD | 13 | 11 | 15 |
| | TD | 17 | 14 | 20 |

What is claimed is:

1. A differential oriented polymer film comprising:
   (a) a core layer containing numerous microscopic voids which impart an opaque, lustrous appearance to an exposed surface of a second skin layer of the film;
   (b) a first skin layer of enhanced wettability on its exposed surface adhering to one surface of the core layer, said skin layer containing an anti-blocking effective amount of anti-blocking agent to render said layer substantially non-blocking; and,
   (c) a second skin layer of enhanced wettability on its exposed surface adhering to the other surface of the core layer, said exposed surface being metallized and said skin layer being substantially devoid of anti-blocking agent or any other component the presence of which would otherwise significantly attenuate the smooth and/or lustrous appearance of its exposed surface.

2. The differential oriented polymer film of claim 1 wherein the core layer (a) is fabricated from isotactic polypropylene.

3. The differential oriented polymer film of claim 2 wherein skin layers (b) and (c) are each fabricated from isotactic polypropylene.

4. The differential oriented polymer film structure of claim 1 wherein core layer (a) and skin layers (b) and (c) are each fabricated from isotactic polypropylene.

5. The differential oriented polymer film structure of claim 1 wherein the void-initiating particles are fabricated from polybutylene terephthalate.

6. The differential oriented polymer film structure of claim 1 which is biaxially oriented.

7. The differential oriented polymer film structure of claim 1 wherein the anti-blocking agent in first skin layer (b) is selected from the group consisting of silica, silicate, clay, diatomaceous earth, talc and glass.

8. The differential oriented polymer film structure of claim 1 wherein core layer (a) and/or first skin layer (b) contains a particulate whitening material.

9. The differential oriented polymer film of claim 8 wherein the whitening material is titanium dioxide.

10. The differential oriented polymer film of claim 1 wherein said enhanced wettability is conferred by corona discharge treatment.

* * * * *